UNITED STATES PATENT OFFICE.

OTTO P. AMEND, OF NEW YORK, N. Y., ASSIGNOR OF ONE-HALF TO JOSIAH H. MACY, OF BOONTON, NEW JERSEY.

PROCESS OF DESULFURIZING OILS OR DISTILLATES.

SPECIFICATION forming part of Letters Patent No. 747,348, dated December 22, 1903.

Application filed March 10, 1903. Serial No. 147,051. (No specimens.)

*To all whom it may concern:*

Be it known that I, OTTO P. AMEND, a citizen of the United States, residing at New York, in the county of New York and State of New York, have invented new and useful Improvements in Processes of Desulfurizing Oils or Distillates, of which the following is a specification.

My invention relates to the elimination of sulfur from sulfur-bearing oil or distillates.

I have found that freshly-precipitated carbonate of copper will combine in neutral and alkaline solutions with sulfur and the sulfur compounds found in Ohio, Indiana, Texas, California, and Canada oils and distillates and that upon effecting such combination and removing the saline solution the remaining hydrosulfid of copper may be eliminated by first subjecting it to the action of sulfuric acid, then removing the sludge and washing with water, after which the desulfurized distillate may be treated by the usual acid and alkali treatment. This especially applies to the naphthas and burning-oil distillates. The heavier distillates, or those used in the manufacture of lubricating-oils, may be desulfurized in the same manner; but as acid and alkali are seriously objectionable in lubricating-oils that part is dispensed with in the treatment of such oils, and a substitution is made immediately after the removal of the saline copper solution by the employment of a ferrous sulfate solution, which acts as a conveyer of oxygen. This exposed to a current of air or a jet of steam, or to both, effects the oxidation of any hydrosulfid of copper present and converts the same into a sulfate, which may be drawn off and separated from the oil or distillate, and thereafter no sulfur reaction will occur, as may be demonstrated by tests made with plumbate of soda, mercury, sodium nitroprusside, or any of the reagents employed to indicate sulfur reaction.

In carrying out my process I proceed as follows: I first wash the distillate and blow it well with air, steam, or with both to remove as much sulfureted hydrogen as possible. I then remove the wash-water and add of caustic-soda solution about one per cent. of the weight of the distillate treated and containing from three to five per cent. of its weight of caustic soda. I then agitate thoroughly. The caustic solution so applied removes a little of the sulfur of the lighter sulfur compounds, as well as a quantity of organic acid, which is always found in the distillate. After sufficient agitation and settling the alkali is removed for the double purpose of disposing of the coloring-matter, which it invariably takes up, and the refuse of the organic acids, which it neutralizes. I then apply of an aqueous solution of a soluble salt of copper in weight about five per cent. of the weight of the distillate and of 25° Baumé strength. The sulfate being the cheapest, I invariably use it for the purpose. After agitation I add of a saturated carbonate of potash or soda solution in weight about one per cent. of the weight of the distillate and of 25° Baumé strength and agitate again. The addition of this carbonate solution gives a freshly-precipitated carbonate of copper. I then allow the distillate to settle and remove the saline solution. The distillate of the naphtha and burning-oil is then thoroughly washed with water, and subsequently it is subjected to the action of sulfuric acid. The sludge is then removed and the oil is washed. Thereafter it receives the usual acid and alkali treatment.

The remaining or heavy distillate obtained after the illuminating-oil distillate, which is used in the manufacture of lubricating-oils, is treated in the same manner, excepting the acid and acid and alkali treatment are dispensed with, and immediately after the removal of the excess of the carbonate of copper the distillate is exposed to the action of a ferrous sulfate solution which acts as a conveyer of oxygen. This exposed to a current of air or jet of steam or both air and steam effects the oxidation of any hydrosulfid of copper present and converts the same into a sulfate, which is then removed. The oil is then washed and allowed to settle and will prove upon test to be free of sulfur.

Having described my invention, what I claim as new, and desire to secure by Letters Patent of the United States, is—

1. The process of desulfurizing oil or distillate which consists: in eliminating sulfureted hydrogen therefrom by washing, blowing with steam or air or by both steam and air; in removing fatty and organic acids contained therein by subjecting them to the action of an alkali, in removing the alkali after agitation; in agitating the oil or distillate with a soluble salt of copper in the presence of a soluble carbonate; in removing the excess of copper salts and copper hydrosulfids thus formed and subjecting the oil or distillate to the action of sulfuric acid, then removing the acid sludge, substantially as described.

2. The process of desulfurizing oil or distillate which consists: in removing fatty and organic acids contained therein by exposing said acids to the action of an alkali; in agitating the oil or distillate and alkali and subsequently removing the alkali; in exposing the oil or distillate to the action of a soluble salt of copper in the presence of a soluble carbonate; in removing the excess of copper salts and copper hydrosulfids thus formed and subjecting the oil or distillate to the action of sulfuric acid and then removing the sludge, substantially as described.

3. The process of desulfurizing oil or distillate which consists: in removing organic acids contained therein by subjecting them to the action of an alkali; in agitating the oil or distillate and removing the alkali so used; in exposing the oil or distillate to the action of a dissolved salt of copper in the presence of a soluble carbonate; in removing the excess of copper salts and copper hydrosulfids thus formed and subjecting the oil or distillate to the action of sulfuric acid and then removing the sludge, substantially as described.

4. The process of desulfurizing oil or distillate which consists: in subjecting the fatty or organic acids contained therein to the action of an alkali and removing the alkali; in exposing the oil or distillate to the action of a soluble salt of copper in the presence of a soluble carbonate; and removing the excess of copper salts, and the copper hydrosulfids thus formed, substantially as described.

5. The process of desulfurizing oil or distillate which consists: in exposing the oil or distillate to the action of a soluble salt of copper in the presence of a soluble carbonate; in removing the excess of copper salts and the copper hydrosulfids thus formed; in subjecting the oil or distillate to the action of sulfuric acid and then removing the sludge substantially as described.

6. The process of desulfurizing oil or distillate which consists; in exposing the oil or distillate to the action of a soluble salt of copper in the presence of a soluble carbonate; in removing the excess of copper salts and the copper hydrosulfids thus formed, substantially as described.

7. The process of desulfurizing oil or distillate which consists; in exposing the oil or distillate to the action of a soluble salt of copper and subseqently to the action of a soluble carbonate, substantially as described.

8. The process of desulfurizing oil or distillate which consists: in exposing the oil or distillate to the action of a freshly-precipitated carbonate of copper and agitating it, substantially as described.

9. The process of desulfurizing oil or distillate which consists: in exposing the oil or distillate to the action of a soluble salt of copper; in exposing the oil or distillate to the action of a soluble carbonate and to contact with a saline solution (as ferrous-sulfate solution), operating as a conveyer of oxygen; in removing the resulting copper sulfate and washing the oil or distillate, substantially as described.

10. The process of desulfurizing oil or distillate which consists: in exposing the sulfur and sulfur compounds therein contained to the action of a soluble salt of copper, also to the action of a soluble carbonate and to contact with a saline solution containing ferrous sulfate and to a supply of air or steam or to both air and steam, substantially as described.

OTTO P. AMEND.

Witnesses:
JACOB B. TOCH,
HERMANN T. MUELLER.